(12) United States Patent
Davydov et al.

(10) Patent No.: US 9,266,103 B1
(45) Date of Patent: Feb. 23, 2016

(54) CATALYST REGENERATORS AND METHODS FOR REGENERATING CATALYSTS

(71) Applicant: UOP LLC, Des Plaines, IL (US)

(72) Inventors: Lev Davydov, Northbrook, IL (US); Mohammad Reza Mostofi-Ashtiani, Naperville, IL (US); Paolo Palmas, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 14/479,161

(22) Filed: Sep. 5, 2014

(51) Int. Cl.
| | | |
|---|---|---|
| *B01J 19/00* | (2006.01) | |
| *B01J 38/12* | (2006.01) | |
| *B01J 8/00* | (2006.01) | |
| *B01J 8/24* | (2006.01) | |
| *B01J 8/18* | (2006.01) | |

(52) U.S. Cl.
CPC *B01J 38/12* (2013.01); *B01J 8/005* (2013.01); *B01J 8/1827* (2013.01); *B01J 8/24* (2013.01); *B01J 2208/00752* (2013.01); *B01J 2208/00858* (2013.01); *B01J 2208/00893* (2013.01); *B01J 2208/00991* (2013.01)

(58) Field of Classification Search
CPC ............ B01J 38/12; B01J 38/04; B01J 38/40; B01J 38/30; B01J 38/34; B01J 19/00
USPC .................................................. 422/144, 129
See application file for complete search history.

(56) References Cited

U.S. PATENT DOCUMENTS

| | | | |
|---|---|---|---|
| 5,158,919 A * | 10/1992 | Haddad et al. | 502/44 |
| 5,451,313 A | 9/1995 | Wegerer et al. | |
| 5,597,537 A | 1/1997 | Wegerer et al. | |
| 7,744,744 B1 * | 6/2010 | Palmas et al. | 208/113 |
| 8,323,477 B2 | 12/2012 | Couch et al. | |
| 2005/0019228 A1 | 1/2005 | Myers et al. | |
| 2012/0082591 A1 | 4/2012 | Palmas | |

* cited by examiner

*Primary Examiner* — Walter D Griffin
*Assistant Examiner* — Huy-Tram Nguyen
(74) *Attorney, Agent, or Firm* — James C. Paschall

(57) ABSTRACT

Catalyst regenerators and methods of their use are provided. A catalyst regenerator includes a combustion chamber with a combustion chamber diameter and a combustion chamber bottom. A mixing chamber is fluidly coupled to the combustion chamber at the combustion chamber bottom, where the mixing chamber has an exterior wall and a mixing chamber diameter less than the combustion chamber diameter. A first and second catalyst inlet are fluidly coupled to the mixing chamber, and a mixing cylinder is within the mixing chamber. The mixing cylinder and the exterior wall define an annular space there-between, and the mixing cylinder includes a cylinder opening.

20 Claims, 9 Drawing Sheets

CATALYST REGENERATORS AND METHODS FOR REGENERATING CATALYSTS

TECHNICAL FIELD

The present disclosure generally relates to catalyst regenerators and methods for regenerating catalysts using the same, and more particularly relates to catalyst regenerators for fluid catalytic cracking processes and methods for regenerating catalysts using the same.

BACKGROUND

Fluid catalytic cracking (FCC) is primarily used to convert high boiling, high molecular weight hydrocarbons into lower boiling, lower molecular weight compounds. The lower molecular weight compounds include gasoline, olefinic compounds, liquid petroleum gas (LPG), diesel fuel, etc. An FCC unit typically uses a catalyst that is repeatedly deactivated and regenerated in a riser and a catalyst regenerator. Air is used to combust (burn off) coke from the deactivated catalyst in the regeneration process, and produces combustion gases such as carbon dioxide and water. Many FCC units use the energy generated from burning the coke from the catalyst to drive the endothermic reaction in the riser.

In a typical FCC units, a hydrocarbon feed stream is contacted with the catalyst at reaction conditions in the riser, and a layer of coke is deposited on the catalyst as the hydrocarbons are cracked into smaller molecules. The deposited coke shields the deactivated catalyst (often referred to as spent catalyst), and the coke is oxidized in the catalyst regenerator so the catalyst can be used again. In many FCC units, the catalyst feed to the catalyst regenerator includes some spent catalyst from the riser combined with some recovered catalyst that has passed through the catalyst regenerator. The spent catalyst produces more heat and combustion gases than the recovered catalyst because it has more coke, so the recovered catalyst is combined with the spent catalyst to better control the temperature in the catalyst regenerator. The spent catalyst and the recovered catalyst are typically combined near the bottom of a combustion chamber of the catalyst regenerator, and the two different catalyst streams normally do not mix well during the prescribed residence time. When the two streams of catalyst are fed into the chamber, they tend to rise straight up or otherwise move side by side without mixing so the spent catalyst distribution in the combustor remains uneven. The side of the combustor that has the spent catalyst tends to operate hotter than the side with the recovered catalyst, as well as producing more combustion gases. The uneven coke loading results in nonuniform combustion, although most combustors are designed for consistent operating conditions. The uneven heat and gas flow rates in the combustor can result in some carbon monoxide or other combustible gas rising into a catalyst separator of the catalyst regenerator, where it can further oxidize and produce undesired heat.

Accordingly, it is desirable to provide catalyst regenerators and methods for regenerating catalyst that mix spent catalyst with recovered catalyst before the mixed catalyst is introduced into the combustor. In addition, it is desirable to provide catalyst regenerators and methods for regenerating catalysts that reduce combustible gases in the catalyst separator of the catalyst regenerator. Furthermore, other desirable features and characteristics of the present embodiment will become apparent from the subsequent detailed description and the appended claims, taken in conjunction with the accompanying drawing and this background.

BRIEF SUMMARY

Catalyst regenerators and methods of using the same are provided. A catalyst regenerator includes a combustion chamber with a combustion chamber diameter and a combustion chamber bottom. A mixing chamber is fluidly coupled to the combustion chamber at the combustion chamber bottom, where the mixing chamber has an exterior wall and a mixing chamber diameter less than the combustion chamber diameter. A first and second catalyst inlet are fluidly coupled to the mixing chamber, and a mixing cylinder is within the mixing chamber. The mixing cylinder and the exterior wall define an annular space there-between, and the mixing cylinder includes a cylinder opening.

In another embodiment, a catalyst regenerator includes a combustion chamber with a combustion chamber diameter and a combustion chamber bottom. A mixing chamber is fluidly coupled to the combustion chamber at the combustion chamber bottom, where the mixing chamber includes an exterior wall. A first catalyst inlet is fluidly coupled to the mixing chamber. An upspout is fluidly coupled to the mixing chamber, where the upspout includes an upspout wall extending into the mixing chamber from a mixing chamber bottom. The upspout wall and the exterior wall define an annular space there-between. A second catalyst inlet if fluidly coupled to the upspout.

A method of regenerating catalyst is also provided. The method includes adding a spent catalyst to a mixing chamber, where the mixing chamber is positioned below a combustion chamber and where the mixing chamber is in fluid communication with the combustion chamber. A recovered catalyst is added to the mixing chamber, and the spent catalyst and the recovered catalyst are mixed in a mixing cylinder positioned within the combustion chamber. The mixed spent and recovered catalysts are discharged from the mixing chamber into the combustion chamber.

BRIEF DESCRIPTION OF THE DRAWINGS

Various embodiments will hereinafter be described in conjunction with the following drawing figures, wherein like numerals denote like elements, and wherein:

FIG. 2 is taken along plane 2-2 from FIG. 1;

FIG. 4 is taken along plane 4-4 from FIG. 3, FIG. 6 is taken along plane 6-6 from FIG. 5, FIGS. 8A-8C are taken along plane 8-8 from FIG. 7, and FIG. 11 is taken along plane 11-11 from FIG. 10.

DETAILED DESCRIPTION

The following detailed description is merely exemplary in nature and is not intended to limit the application or uses of the embodiment described. Furthermore, there is no intention to be bound by any theory presented in the preceding technical field, background, brief summary, or the following detailed description.

Catalyst regenerators and methods for regenerating catalysts using the same are provided herein. Deactivated (spent) catalyst is transferred from a riser to a catalyst regenerator in an FCC unit, where the coke on the catalyst is combusted. Additional catalyst from the catalyst regenerator (recovered catalyst) is combined with the spent catalyst, where the coke has been removed from the recovered catalyst by combustion. The spent catalyst and the recovered catalyst are combined and mixed in a mixing chamber before being introduced into a combustion chamber of the catalyst regenerator for combustion. Recovered catalyst is added to the spent catalyst to better control the temperature in the catalyst regenerator. The mixing chamber includes a mixing cylinder or an upspout configured to mix the two streams of catalyst, so the spent and activated catalyst are mixed together (instead of being just combined) before being introduced into the combustion chamber. Several embodiments of the mixing chamber are possible. Coke is combusted more consistently and more completely when the spent and recovered catalysts are mixed instead of just being combined, because the oxidizer (in the form of oxygen) will not pass any portion of the combustor without encountering the fuel which is present uniformly throughout the combustor cross section in the form of coke on the spent catalyst.

Figure 1:
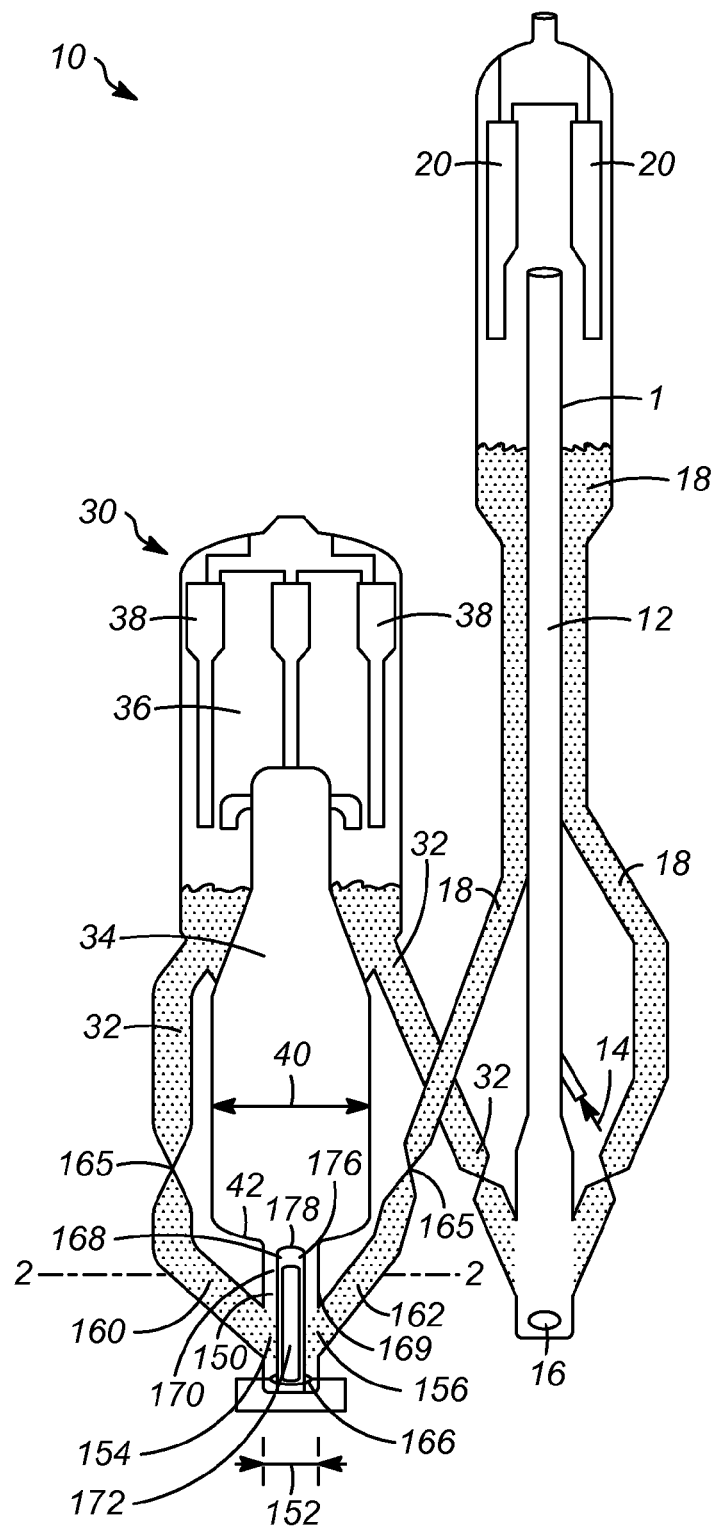
FIG. 1 is a cross-sectional view of an exemplary embodiment of a fluid catalytic cracking unit.

Reference is made to the exemplary embodiment illustrated in FIG. 1. A fluid catalytic cracker 10 (FCC) includes a riser 12 and a catalyst regenerator 30. A hydrocarbon feed 14 is added to the riser 12 and combined with a recovered catalyst 32, where the hydrocarbon feed 14 and recovered catalyst 32 is fluidized by a riser fluidizing gas destributor 16. The hydrocarbon feed 14 and the recovered catalyst 32 rise up the riser 12, where hydrocarbons within the hydrocarbon feed 14 are cracked and at least a portion of the reactive sites of the recovered catalyst 32 are covered and deactivated by coke to produce spent catalyst 18. The spent catalyst 18 is separated from the cracked hydrocarbons in a riser cyclone 20, where the spent catalyst 18 is collected and the cracked hydrocarbons are removed from the riser 12 and separated in various fractions, such as by distillation (not illustrated). Solid and gaseous separators other than cyclones can be used in place of the riser cyclone 20 in alternate embodiments. Some of the spent catalyst 18 may optionally be combined with the recovered catalyst 32 at a base of the riser 12 for the cracking reaction. In an exemplary embodiment, the ratio of recovered catalyst 32 to spent catalyst 18 is from about 0.5 to about 3.

The spent catalyst 18 and the recovered catalyst 32 are any of a variety of catalysts suitable for an FCC unit, as understood by those skilled in the art. Suitable catalysts for use herein include high activity crystalline alumina silicate and/or zeolite, which are dispersed in a porous inorganic carrier material such as silica, aluminum, zirconium, or clay. An exemplary embodiment of a catalyst includes crystalline zeolite as the primary active component, a matrix, a binder, and a filler. The zeolite ranges from about 10 to about 50 weight percent of the catalyst, and is a silica and alumina tetrahedral with a lattice structure that limits the size range of hydrocarbon molecules that can enter the lattice. The matrix component includes amorphous alumina, and the binder and filler provide physical strength and integrity. Silica sol or alumina sol are used as the binder and kaolin clay is used as the filler. Standard reaction conditions for fluid catalytic cracking are used in the riser 12, as understood by those skilled in the art.

Spent catalyst 18 is transferred to the catalyst regenerator 30 to combust the coke and regenerate the spent catalyst 18 into recovered catalyst 32. The catalyst regenerator 30 includes a combustion chamber 34 and a catalyst separator 36 where the recovered catalyst 32 is separated from flue gas created in the combustion chamber 34. An oxygen supply gas is coupled to the combustion chamber 34 and carries the spent catalyst 18 through the combustion chamber 34 into the catalyst separator 36. The coke is burned off the spent catalyst 18 by contact with the oxygen supply gas at regeneration conditions. In an exemplary embodiment, air is used as the oxygen supply gas, because air is readily available and provides sufficient $O_2$ for combustion, but other gases with a sufficient concentration of $O_2$ could also be used, such as purified $O_2$. If air is used as the oxygen supply gas, about 10 to about 15 kilograms (kg) of air is required per kg of coke burned off of the spent catalyst 18. Exemplary regeneration conditions include a temperature from about 500° C. to about 900° C. (900° F. to 1,700° F.) and a pressure of about 150 kPa to about 450 kPa (20 PSIG to 70 PSIG) in the combustion chamber 34. The superficial velocity of the oxygen supply gas is typically less than about 2 meters per second (6 feet per second), and the density within the combustion chamber 34 is typically about 80 to about 400 kilograms per cubic meter (about 5-25 lbs. per cubic foot). However, the catalyst regenerator 30 may be designed and sized based on the expected duty, so the catalyst regenerator 30 may be larger or smaller than as described above.

The catalyst separator 36 may include one or more regenerator cyclones 38 or other solid/gaseous separator devices to separate the recovered catalyst 32 from the flue gas. The recovered catalyst 32 collects within the catalyst separator 36, and from there is transferred to the riser 12 for re-use in cracking hydrocarbons. The combustion chamber 34 has a combustion chamber diameter indicated by the double headed arrow 40, where the combustion chamber diameter 40 is measured at the widest point of the combustion chamber 34. A combustion chamber bottom 42 is along the lowest portion of the combustion chamber 34, such as the portion below the essentially vertical walls of the combustion chamber 42.

Figure 2:
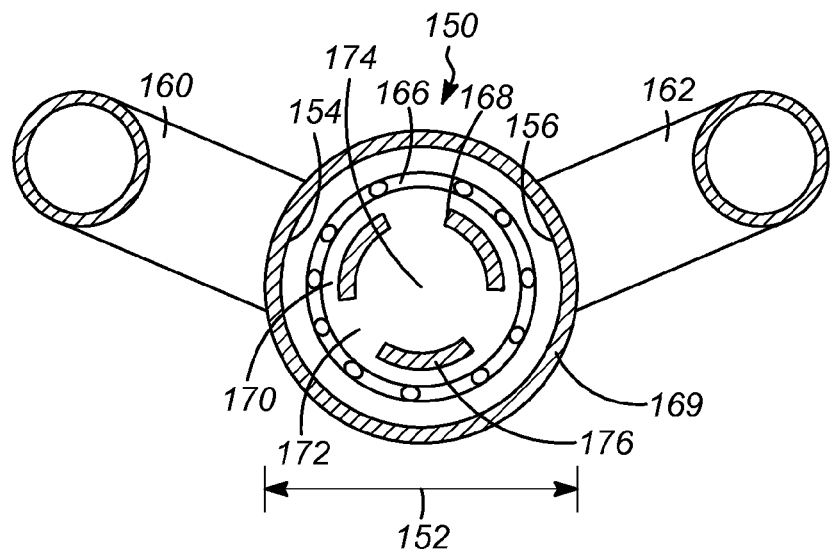
FIG. 2 is a plane sectional view of an exemplary embodiment of a mixing chamber for a fluid catalytic cracking unit, where

In an exemplary embodiment, a mixing chamber 150 is fluidly coupled to the combustion chamber 34 at the combustion chamber bottom 42, as illustrated in FIG. 2 with continuing reference to FIG. 1, where FIG. 2 is taken along plane 2-2 from FIG. 1. The mixed catalyst, including the spent catalyst 18 and the recovered catalyst 32, is discharged from the mixing chamber 150 into the combustion chamber 34. The mixing chamber 150 may be centered along the combustion chamber bottom 42, so the combustion chamber 34 and the mixing chamber 150 have a common longitudinal axis (not illustrated). There are several different embodiments of the mixing chamber 150, and like elements are represented by the same two last digits of the reference number, with the preceding digits varying from one embodiment to the next. The various embodiments represent options for mixing the spent catalyst 18 and the recovered catalyst 32 before the mixture is introduced into the combustion chamber 34, and components of different embodiments may be combined for a new embodiment not specifically illustrated or described herein.

The spent catalyst 18 and the recovered catalyst 32 are separately added to the mixing chamber 150 and then mixed before exiting the mixing chamber 150 and entering into the combustion chamber 34. In alternate embodiments, the spent and recovered catalyst 18, 32 are mixed in an upspout before entering the combustion chamber 34 (described below). Mixed spent and recovered catalyst 18, 32 is different than combined spent and recovered catalyst 18, 32 because the mixed spent and recovered catalyst 18, 32 does not have a significant concentration gradient of coke from one area to another, where coke is present on the spent catalyst 18 at about 1 to about 2.5 weight percent but the recovered catalyst 32 has essentially no coke. For example, when spent and recovered catalyst 18, 32 are merely combined at a 50/50 ratio, any standard sample of catalyst may be all spent catalyst 18, all recovered catalyst 32, or any combination in between. Therefore, in a combination of 50% spent catalyst 18 and 50% recovered catalyst 32, the total weight of coke may vary from about 0 grams to about 2.5 grams in a 100 gram sample (0 grams if the combination is all recovered catalyst 32, and 2.5 grams if the combination is all spent catalyst 18.) The same analysis applies for ratios other than 50/50. The concentration gradient of coke for a combined catalyst can vary significantly from the average coke concentration, where the average coke concentration for the example described above is 1.25 grams of coke per 100 grams of sample.

For mixed catalyst (as compared to merely combined catalyst), the total weight percent of coke for any one sample may vary from the average coke concentration by about 10 weight percent or less, or about 5 weight percent less, or about 3 weight percent or less in various embodiments. Therefore, "mixed catalyst" is defined as catalyst with an insignificant concentration gradient of coke, where an insignificant concentration gradient of coke is such that the weight percent of coke on any standard sample size (such as one hundred grams of catalyst) varies from the average coke concentration by about 10 percent or less, 5 percent or less, or 3 percent or less in various embodiments. To illustrate, for a 50/50 mixture of spent and recovered catalyst 18, 32 with 2.5 grams of coke per 100 grams of spent catalyst 18, the average coke concentration will be 1.25 grams of coke per 100 grams of sample (½ spent catalyst 18 with 2.5 grams coke per 100 grams of spent catalyst 18, and ½ recovered catalyst 32 with 0 grams coke per 100 grams of recovered catalyst 32). In an exemplary embodiment with 5 weight percent variation or less, any sample of mixed catalyst will have within 5 weight percent of 1.25 grams of coke per 100 grams of sample, so any 100 gram sample will have from about 1.1875 grams to about 1.3125 grams of coke.

In an exemplary embodiment, the mixing chamber 150 has a mixing chamber diameter indicated by the double headed arrow 152, where the mixing chamber diameter 152 is less than the combustion chamber diameter 40. The mixing chamber 150 may be cylindrical in some embodiments. A first catalyst inlet 154 is fluidly coupled to the mixing chamber 150, and a second catalyst inlet 156 is also fluidly coupled to the mixing chamber 150. The first catalyst inlet 154 discharges one of the spent catalyst 18 or the recovered catalyst 32 through a first catalyst line 160 into the mixing chamber 150, and the second catalyst inlet 156 discharges the other through a second catalyst line 162. Valves 165 may be included in the first and second catalyst lines 160, 162 (and any other catalyst lines as described below) to control the rate of flow of the catalyst to the mixing chamber 150. The first and second catalyst inlets 154, 156 are fluidly coupled to the riser 12 or the catalyst separator 36 of the catalyst regenerator 30 through the first and second catalyst lines 160, 162 such that catalyst flows through the first and second catalyst lines 160, 162 into the mixing chamber 150. In some embodiments, the catalyst is fluidized in the first and/or second catalyst lines 160, 162 to facilitate catalyst flow. One or both of the first and second catalyst inlets 154, 156 may optionally be tangentially connected to the mixing chamber 150 (tangential connection not illustrated) to impart an angular motion to the catalyst to promote mixing. Additionally, ramps (not illustrated) may be installed at the first and/or second catalyst inlet 154, 156 to further promote mixing. The ramps may direct the flowing catalyst upward, downward, or to one side or the other in various embodiments. A mixing gas distributor 166 fluidizes the catalyst within the mixing chamber 150 and carries the catalyst from the mixing chamber 150 into the combustion chamber 34. The gas discharged from the mixing gas distributor 166 may be air or other gases in various embodiments.

A mixing cylinder 168 may be positioned within the mixing chamber 150 in some embodiments, where the mixing cylinder 168 and an exterior wall 169 of the mixing chamber 150 define an annular space 170 there-between. The first and second catalyst inlets 154, 156 open into the annular space 170 in some embodiments, where the catalyst inlets 154, 156 are positioned below the section line in FIGS. 2, 4, 6, 8A, 8B, 8C, and 11 such that they are not visible, but are indicated with reference numbers to illustrate the location. The mixing cylinder 168 may be radially centered within the mixing chamber 150, and the mixing cylinder 168 may be cylindrical in shape. In other words, the mixing cylinder 168 may have a central longitudinal axis (not illustrated) aligned with a central longitudinal axis (not illustrated) of the mixing chamber 150. A cylinder wall section 176 of the mixing cylinder 168 may be vertical in some embodiments. The mixing gas distributor 166 is positioned within the annular space 170 in some embodiments, where the annular space 170 is a portion of the mixing chamber 150.

In an exemplary embodiment, one or more cylinder openings 172 are defined in the cylinder wall section 176 of the mixing cylinder 168. The cylinder opening 172 serves as an entrance into an interior 174 of the mixing cylinder 168, and the cylinder opening 172 can also serve as an exit from the interior 174. In an exemplary embodiment, one or more of the cylinder openings 172 has an elongated configuration that is spaced from the near the top of the mixing cylinder 168 (referred to herein as a cylinder top 178,) such as from within about 1 to about 10 centimeters from the cylinder top 178. In alternate embodiments (not illustrated), one or more of the illustrated cylinder openings 172 (in this embodiment and in the embodiments described below) may include two or more openings, with one opening above the other such that the openings are radially aligned on the mixing cylinder 168. Without wishing to be bound by theory, it is believed that the spent and recovered catalyst 18, 32 from the first and second catalyst lines 160, 162 may enter the interior 174, mix, and then exit the interior 174 through the cylinder opening 172 as a mixed catalyst ready for the combustion chamber 34. The mixed catalyst produces a more consistent temperature in the combustion chamber 34 than a mere combination of the spent catalyst 18 and the recovered catalyst 32 that has not been mixed before entering the combustion chamber 34, and also produces less combustible gas exiting the combustion chamber 34 and entering the catalyst separator 36.

The interior 174 is in fluid communication with the annular space 170 through the cylinder opening 172. In an exemplary embodiment, the upper most portion of the cylinder opening 172 is above the lower most portions of the first and second catalyst inlets 154, 156, and is optionally above the upper most portions of the first and second catalyst inlets 154, 156 as well. The upper most portion of the first catalyst inlet 154 is the highest elevation of the intersection of the first catalyst inlet 154 with the mixing chamber 150, the lowest most portion is the lowest elevation of the intersection of the first catalyst inlet 154 with the mixing chamber 150, and the same applies to other inlets. In embodiments with the upper most portion of the cylinder opening 172 above the upper most portion of the first and/or second catalyst inlets 154, 156, the catalyst from the first and/or second catalyst inlets 154, 156 can flow upward with the fluidizing gas from the mixing gas distributor 166 through the cylinder opening 172 and into the interior 174 of the mixing cylinder 168.

Reference is made to FIG. 2 with continuing reference to FIG. 1, where FIG. 2 is taken along plane 2-2 from FIG. 1. FIG. 2 illustrates three cylinder wall sections 176 of the mixing cylinder 168 that have an arcuate cross section, where FIGS. 1 and 2 illustrate the same embodiment. One of the arcuate cylinder wall sections 176 faces the first catalyst inlet 154 such that catalyst exiting the first catalyst inlet 154 enters the annular space 170 between the first catalyst inlet 154 and one of the arcuate cylinder wall sections 176 of the mixing cylinder 168. Another of the arcuate cylinder wall sections 176 faces the other of the second catalyst inlet 156 such that catalyst enters the annular space 170 between the other of the second catalyst inlet 156 and the other arcuate cylinder wall section 176. The arcuate cylinder wall sections 176 facing the first and second catalyst inlets 154, 156 may be narrower or wider than the openings of the first and/or second catalyst inlets 154, 156. The third arcuate cylinder wall section 176 is optional. In an exemplary embodiment, one of the three cylinder openings 172 has a larger width than the other two cylinder openings 172, and the two smaller cylinder openings 172 have about the same width, such as within about 1 centimeter of each other.

Without wishing to be by bound by theory, it is believed that in operation the catalyst from the first catalyst inlet 154 enters the annular space 170 and encounters an arcuate cylinder wall section 176. The catalyst passes along the cylinder wall section 176 and enters the interior 174 of the mixing cylinder 168 through one of the cylinder openings 172. The catalyst from the second catalyst inlet 156 follows a similar flow pattern and enters the interior 174 of the mixing cylinder 168. The catalyst from the first and second catalyst inlets 154, 156 then mix in the interior 174 and exit the interior 174 back into the annular space 170 and then into the combustion chamber 34. The spent and recovered catalyst 18, 32 also comingle and mix in the annular space 170 and other areas within the mixing chamber 150 before entering the combustion chamber 34.

The mixing cylinder 168 may have a cylinder top 178 that is closed, so catalyst from the interior 174 must pass laterally through one of the cylinder openings 172 to enter the annular space 170 or the upper portions of the mixing chamber 150. The cylinder top 178 may have a hemispherical shape, and the cylinder top 178 may be sized such that the cross sectional area of the annular space 170 at the elevation of the cylinder top 178 is about half the cross sectional area of the mixing chamber 150 (including the area of the mixing cylinder 168) at the elevation of the cylinder top 178. For example, the cross sectional area of the annular space 170 may be about 40 to about 60 percent of the cross sectional area of the mixing chamber 150 at the elevation of the cylinder top 178. Consequently, the superficial velocity within the mixing chamber 150 at the elevation of the cylinder top 178 is about twice the superficial velocity at other locations within the mixing chamber 150. The changing superficial velocity may promote mixing of the catalyst. In some embodiments, at least one of the cylinder openings 172 is spaced from the cylinder top 178 by about one quarter of a diameter of the mixing chamber 150, such as about 20 to about 30 percent of the diameter of the mixing chamber 150.

In an exemplary embodiment, the mixing chamber 150 may be made of stainless steel, such as 300 Series stainless steel lined with refractory. The edges of the cylinder openings 172 may be designed to resist erosion, such as with thicker edges than the rest of the cylinder wall sections 176. The edges of the cylinder openings 172 may also be cured to deflect eroding catalyst particles, and a weld beam can be formed at the edges to further resist erosion. The mixing chamber 150 and mixing cylinder 168 may be made of or coated with a ceramic or other material that helps resist erosion.

Figure 3:
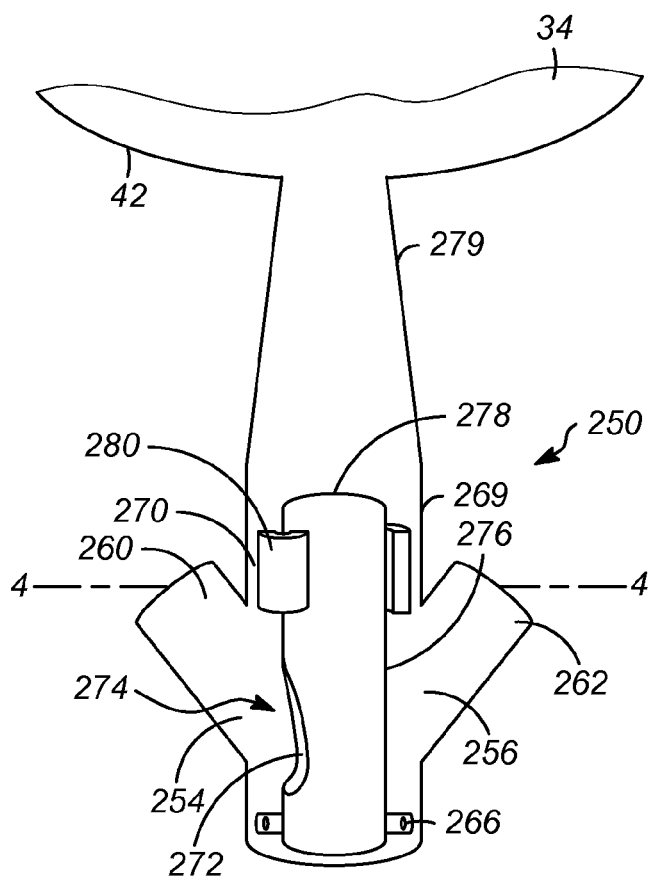
FIGS. 3, 5, 7, 9, 10, and 12 are side sectional views of various exemplary embodiments of a mixing chamber for a fluid catalytic cracking unit.
Figure 4:
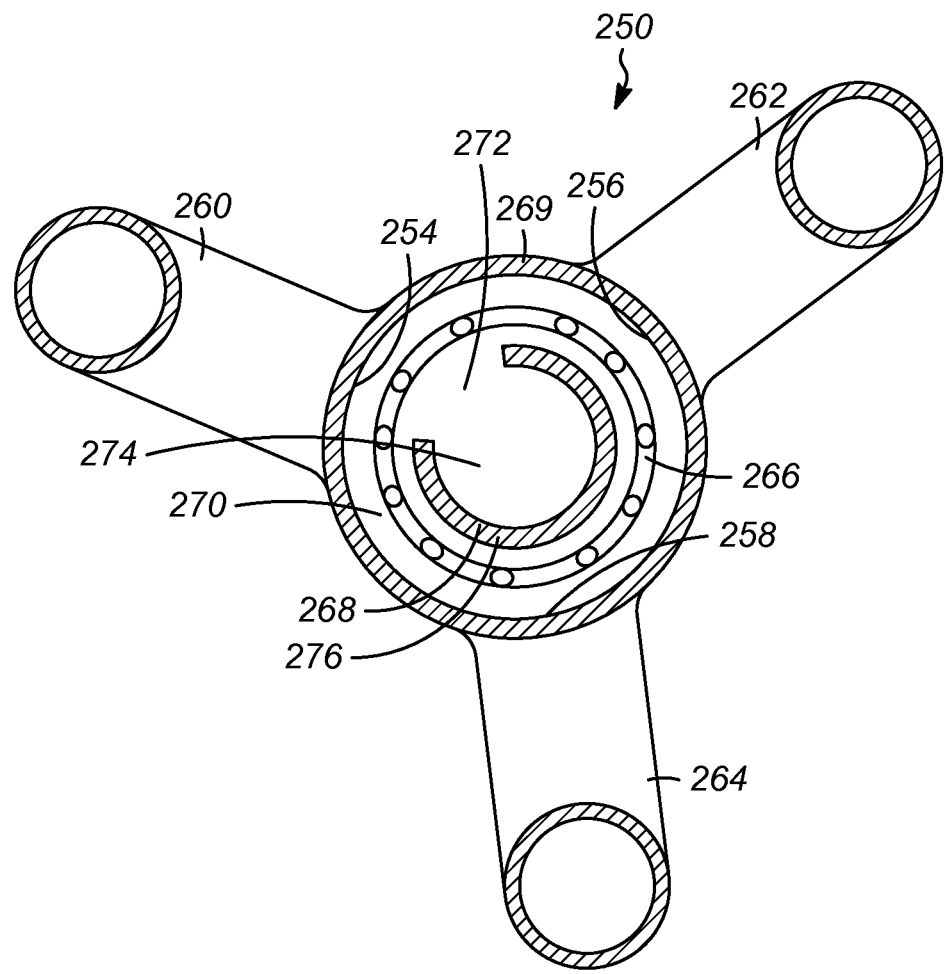
FIGS. 4, 6, 8A, 8B, 8C and 11 are plane sectional views of various exemplary embodiments of a mixing chamber for a fluid catalytic cracking unit, where

FIGS. 3 and 4 illustrate other embodiments of the mixing chamber 250, with continuing reference to FIG. 1, where the components of the riser 12 and the catalyst regenerator 30 not illustrated in FIGS. 3 and 4 (and the remaining FIGS.) are the same as in FIG. 1. FIG. 3 illustrates an embodiment with a first and second catalyst inlet 254, 256, and FIG. 4 illustrates an embodiment with a first, second, and third catalyst inlet 254, 256, 258 and associated first, second, and third catalyst lines 260, 262, 264. FIG. 4 is taken along plane 4-4 from FIG. 3, with the exception that FIG. 4 is an alternate embodiment with three inlets. Other embodiments discussed herein may include two, three, or more catalyst inlets and associated catalyst lines, and the third and additional catalyst lines may convey either spent catalyst 18 or recovered catalyst 32 in various embodiments. Additional catalyst inlets may convey catalyst from various sources, such as recovered catalyst 32 that has been cooled in a catalyst cooler (not illustrated), spent catalyst 18 from a second riser (not illustrated) coupled to the catalyst regenerator 30, or other catalyst sources.

In an exemplary embodiment, the mixing chamber 250 has a frustoconical section 279 where the cross sectional area of the mixing chamber 250 decreases within the frustoconical section 279 as the elevation increases. The frustoconical section 279 may be near the top of the mixing chamber 250. The frustoconical section 279 increases the superficial velocity, and may promote mixing. The cylinder top 278 may be located within the frustoconical section 279 in some embodiments, but the cylinder top 278 may be below the frustoconical section 279 in alternate embodiments. In the illustrated embodiment, the mixing cylinder 268 is radially centered in the mixing chamber 250, and the annular space 270 is defined between the mixing cylinder 268 and the exterior wall 269 of the mixing chamber 250. The first, second and third catalyst lines 260, 262, 264 are in fluid communication with the annular space 270, and the first, second and third catalyst lines 260, 262, 264 are also in fluid communication with the interior 274 of the mixing cylinder 268 through the cylinder opening 272, similar to as described above. The cylinder opening 272 is aligned with one of the first, second, or third catalyst inlets 154, 156, 158, so catalyst from the selected inlet (the first catalyst inlet 254 for illustration purposes) enters the annular space 270 and flows directly into the interior 272 of the mixing cylinder 268 through the cylinder opening 272. A portion of the catalyst from the first catalyst inlet 254 and the catalyst from the other catalyst inlets 256, 258 may travel along the cylinder wall section 276 and pass into the interior 272 indirectly. A second cylinder opening 272 (not illustrated) may be aligned with another inlet, such as the second or third catalyst inlet 256, 258 in alternate embodiments. The different streams of catalyst may mix when entering and exiting the interior 274, and when moving within the mixing chamber 150 as described above.

One or more swirl arms 280 may be coupled to the mixing cylinder 268 in some embodiments. The swirl arms 280 are located in a vertical portion of the cylinder wall section 276 and provide an exit from the interior 274. The swirl arms 280 define a path from the interior 274 to the annular space 270 of the mixing chamber 250 outside of the mixing cylinder 268, and the path is configured to create a swirling motion for catalyst, gases, or fluids passing from the interior 274 through the swirl arms 280. The swirl-imparting configuration may be an arcuate tube, and the cross section of the arcuate tubes may be rectangular, round or other shapes in various embodiments. The exit of the swirl arm 280 may be tangential or nearly tangential to the round cross sectional shape of the mixing cylinder 268, and the exit may point horizontally or at other angles to promote the swirling action. In embodiments with more than one swirl arm 280, the swirl arms 280 may be curved in the same direction so each swirl arm 280 imparts a swirling motion in the same direction. The swirl arm(s) 280 may have a lower most portion that is at an elevation above the lower most portion of the cylinder opening 272, and the swirl arm's lower most portion may also be at an elevation above the upper most portion of the cylinder opening 272. As such, at least some of the catalyst may enter the interior 274 through the cylinder opening 272 and exit the interior 274 through the swirl arms 280 as the catalyst travels upwards within the mixing chamber 150. Fluidizing gas from the mixing gas distributor 266 propels the catalyst into the interior 274 and upward through the swirl arms 280. The swirling motion imparted by the swirl arms 280 may further promote catalyst mixing.

Figure 5:
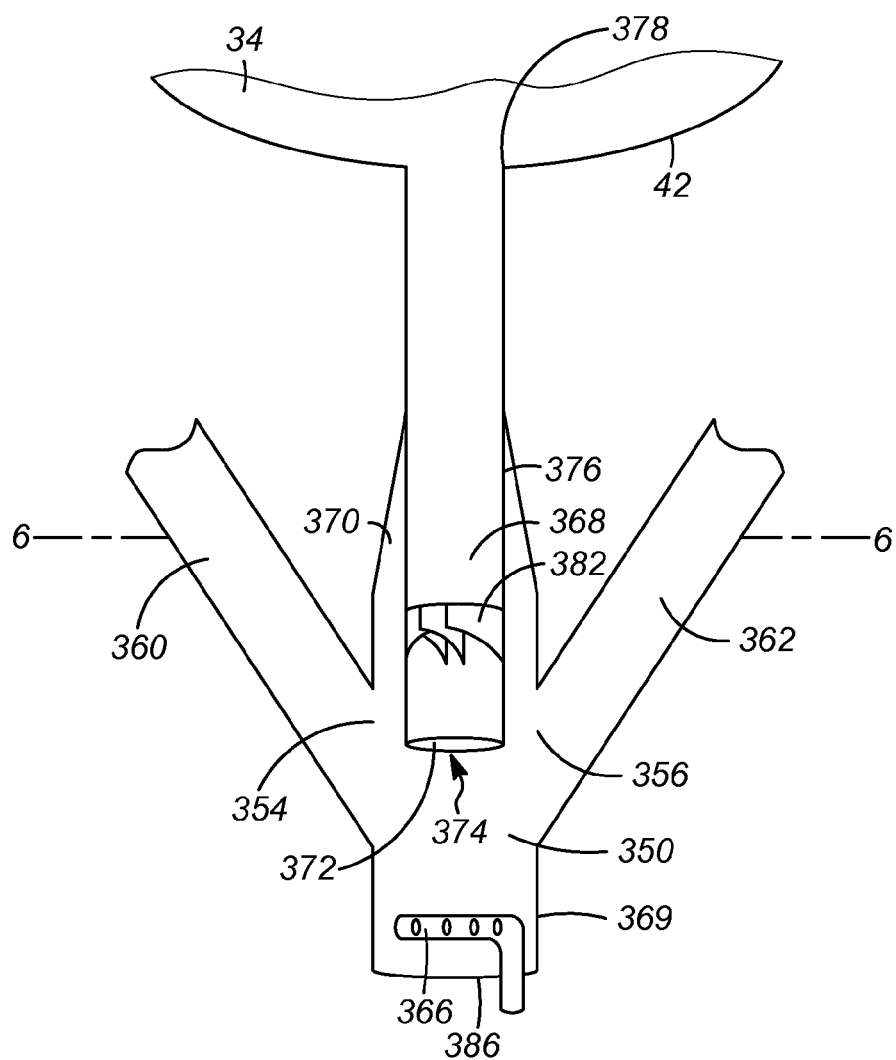
Figure 6:
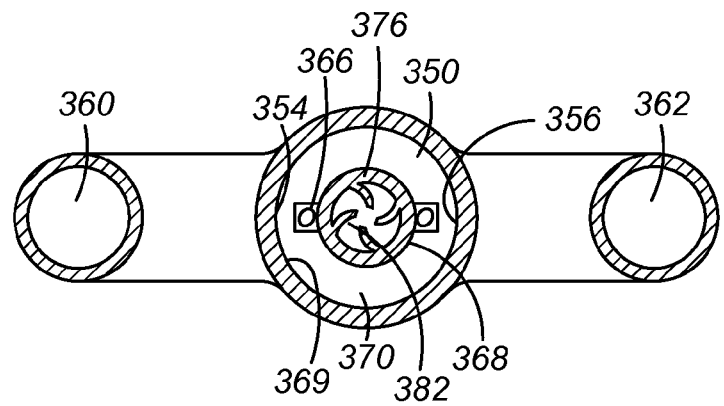
Figure 7:
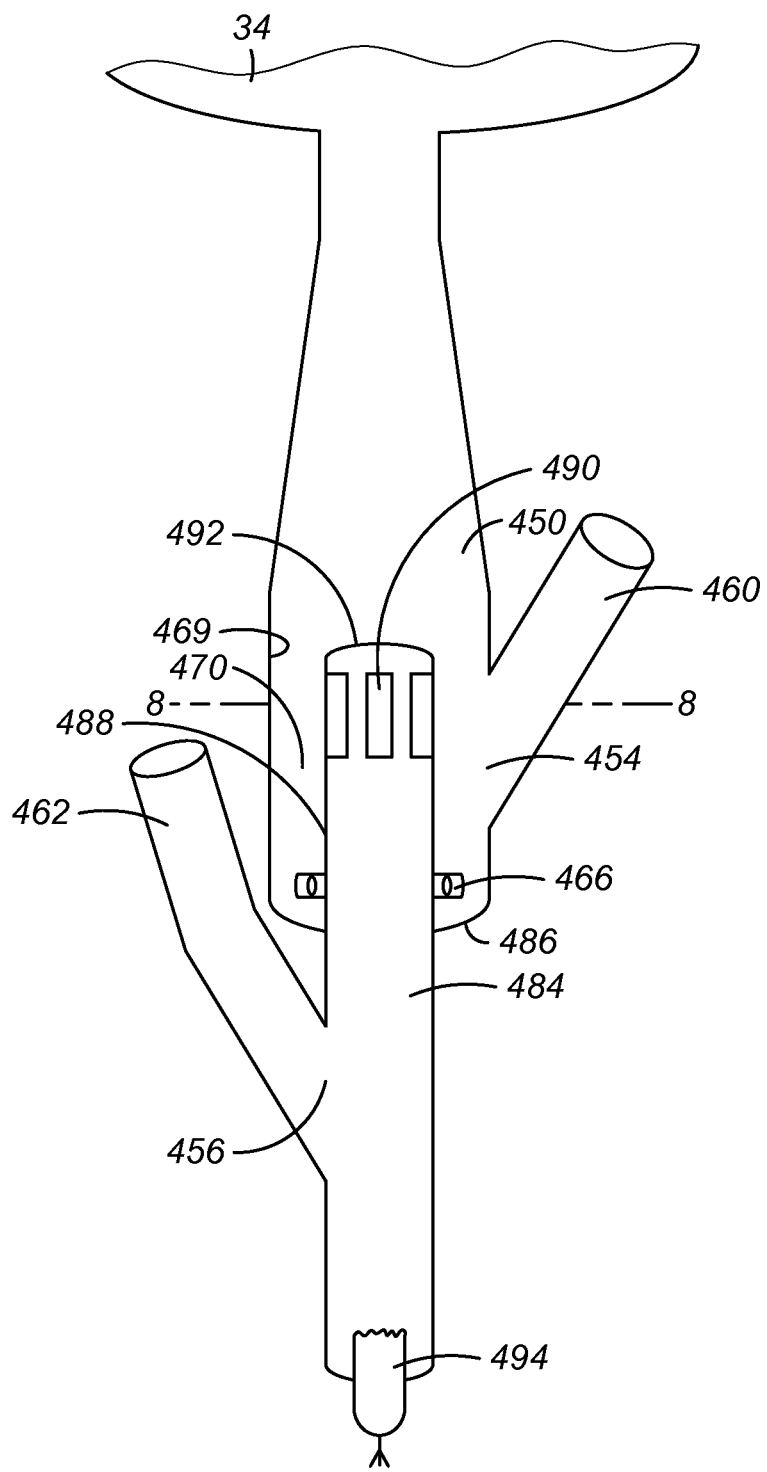

Yet another embodiment is illustrated in FIGS. 5 and 6, with continuing reference to FIG. 1. In this embodiment, the bottom of the mixing cylinder 368 is suspended above a mixing chamber bottom 386. The mixing cylinder 368 is connected to the top of the mixing chamber 350, and there are one or more mixing vanes 382 in the interior 374 of the mixing cylinder 368. A cylinder wall section 376 of the lower portion of the mixing cylinder 368 in FIG. 5 is removed to illustrate the mixing vanes 382, and the cylinder wall section 376 of the upper portion of the mixing cylinder 368 blocks the view of the mixing vanes 382. FIG. 6 is taken along plane 6-6 from FIG. 5.

The catalysts from the first and second catalyst lines 360, 362 combine in the mixing chamber 350 and are lifted by fluidizing gas from the mixing gas distributor 366 into the cylinder opening 372 at the bottom of the mixing cylinder 368. The cylinder opening 372 may be at an elevation above a bottom portion of the first and/or second catalyst inlets 354, 356, and below an elevation of a top portion of the first and/or second catalyst inlets 354, 356. The cylinder top 378 is open in the embodiment illustrated in FIGS. 5 and 6, and all the catalyst exits the mixing cylinder 368 through the cylinder top 378. The spent and recovered catalyst 18, 32 passes from the mixing chamber 350 into the mixing cylinder 368 and then flows upward into the combustion chamber 34, so the mixing chamber 350 is fluidly coupled to the combustion chamber 34 through the mixing cylinder 368.

The catalyst is swirled by one or more mixing vanes 382 as the catalyst travels through the mixing cylinder 368. The mixing vanes 382 inside the mixing cylinder 368 extend from the cylinder wall section 376 into the interior 374 with a curved shape, and the mixing vane 382 may have a helical shape as it extends upward within the mixing cylinder 368 to impart angular momentum and create a swirling motion. The mixing vane 382 may be located anywhere within the mixing cylinder 368, and may extend for all or any portion of the length of the mixing cylinder 368. The superficial velocity increases as the fluidized catalyst enters the smaller area of the mixing cylinder 368 relative to the larger area of mixing chamber 350, and the swirling motion and increased superficial velocity promote mixing. A vertical baffle (not illustrated) may be positioned within the annular space 370 to help minimize comingling of the spent and recovered catalyst 18, 32 in the stagnant annular space 370. Alternatively, a horizontal baffle (not illustrated) may prevent catalyst from entering the stagnant annular space 370.

Figure 8A:
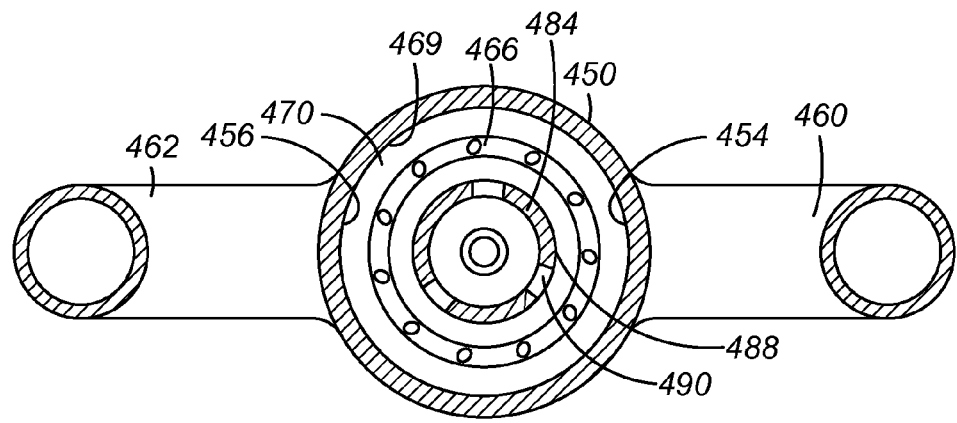
Figure 8B:
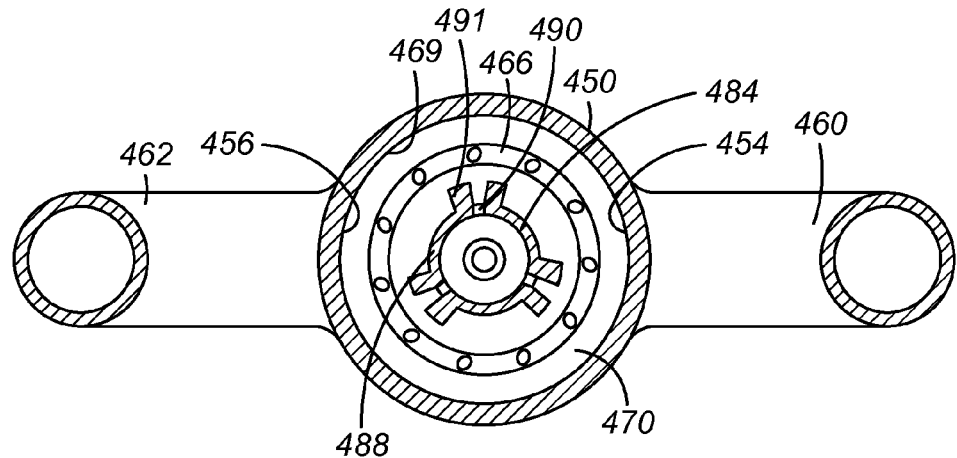
Figure 8C:
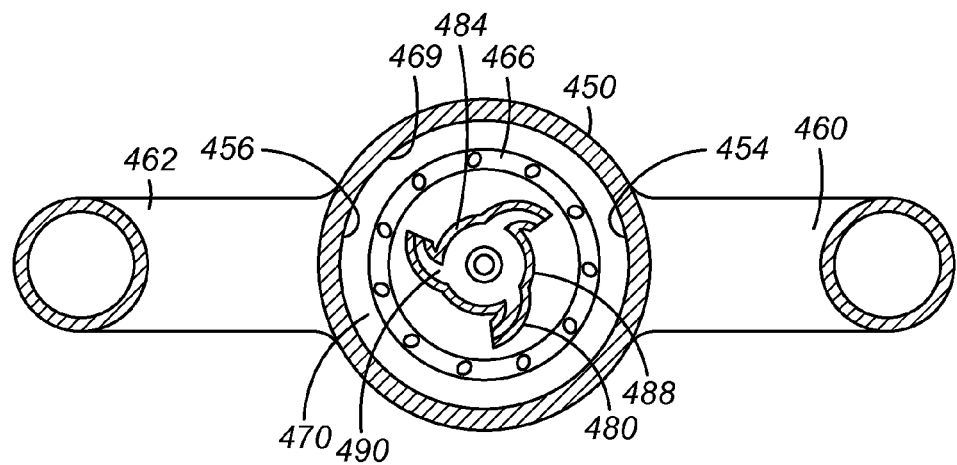

Reference is made to the exemplary embodiment illustrated in FIGS. 7 and 8A-8C, with continuing reference to FIG. 1. FIGS. 8A-8C are taken along plane 8-8 of FIG. 7 and illustrate various embodiments. In the embodiment illustrated in FIGS. 7 and 8A-8C, one of the first or second catalyst inlets 454, 456 (the first catalyst inlet 454 for illustration purposes) opens into the mixing chamber 450, and the other of the first or second catalyst inlets 454, 456 (the second catalyst inlet 456 for illustration purposes) opens into an upspout 484. The upspout 484 extends into the mixing chamber 450 from a mixing chamber bottom 486 such that the annular space 470 is between an upspout wall 488 and the exterior wall 469 of the mixing chamber 450. The upspout 484 is radially centered within the mixing chamber 450 in some embodiments. In the illustrated embodiment, the upspout wall 488 defines an upspout gap 490 positioned in a vertical section of the upspout wall 488 below a closed upspout top 492. The upspout gap 490 may be at an elevation above a lower most portion of the first catalyst inlet 454, and it may also be at an elevation above an upper most portion of the first catalyst inlet 454 so some of the catalyst from the first catalyst inlet 454 travels upward to reach the upspout gap 490.

The catalyst from the second catalyst line 462 enters the upspout 484 and is fluidized by gas coming from a fluidizing gas inlet 494 positioned within the upspout 484 at an elevation below the lower most portion of the second catalyst inlet 456. The catalyst travels upward and exits the upspout 484 through the upspout gap 490 into the annular space 470. The spent and recovered catalyst 18, 32 are mixed in the annular space 470 and in the frustoconical section 479 of the mixing chamber 450 before entering the combustion chamber 34. The mixing gas distributor 466 is positioned within the mixing chamber 450 in the annular space 470 below the lower most portion of the upspout gap 490 and the lower most portion of the first catalyst inlet 454. The mixed catalyst is fluidized and carried upward by gas from the mixing gas distributor 466, as described above. A third catalyst inlet and an associated third catalyst line (not illustrated) may be fluidly coupled to one of the mixing chamber 450 or the upspout 484, as described above, where the third catalyst line may be configured to transport spent catalyst 18 or recovered catalyst 32. Additional catalyst lines are also possible, as described above.

FIG. 8A illustrates an embodiment where the upspout wall 488 defines the upspout gap 490 as a simple void area within the upspout wall 488. FIG. 8B illustrates an embodiment where the upspout gap 490 includes projections 491 to direct catalyst into the annular space 470, where the projections 491 extend from into the annular space 470 from opposite sides of the upspout gap 490. FIG. 8C illustrates an embodiment where the upspout gap 490 is configured to swirl the catalyst as it exits the upspout gap 490. In FIG. 8C, the upspout gap 490 includes a swirl arm 480 coupled to the upspout gap 490 so catalyst exiting through the upspout gap 490 flows through the swirl arm 480. The swirl arm 480 includes a tube having an arcuate shape that bends as it extends into the annular space 470. The tube of the swirl arm 480 may have an exit that is radial to an upspout longitudinal axis (not illustrated) to promote a swirling motion and promote mixing, similar to the swirl arms described above.

Figure 9:
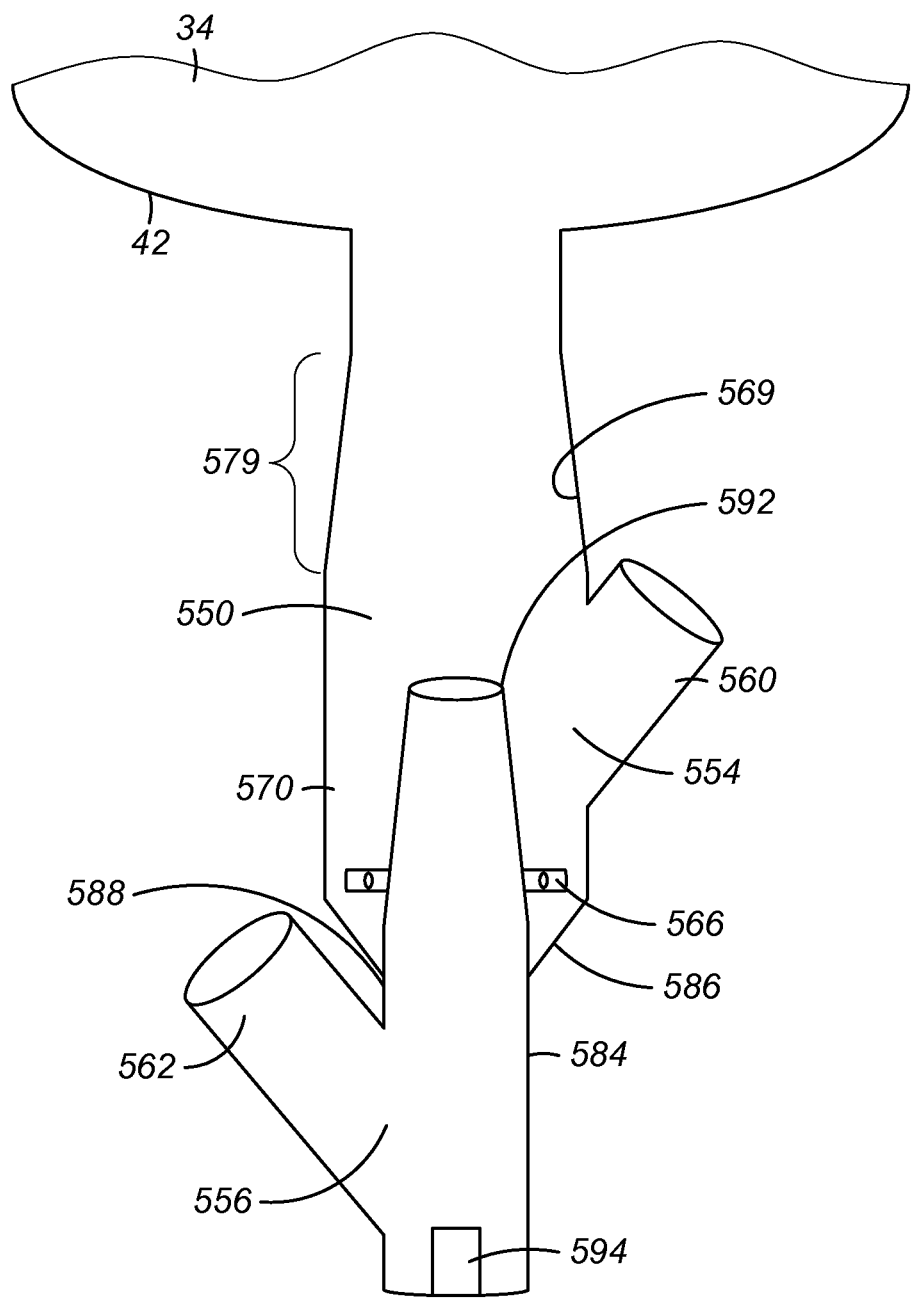

Referring to FIG. 9 with continuing reference to FIG. 1, an embodiment of the mixing chamber 550 with an upspout 584 is illustrated. The upspout 584 includes a frustoconical upspout wall 588 within the mixing chamber 550 with an open upspout top 592. The catalyst from the second catalyst line 562 is fluidized by the fluidizing gas inlet 594 in the upspout 584, and the catalyst from the first catalyst line 560 is fluidized by the mixing gas distributor 566 in the annular space 570 between the exterior wall 569 of the mixing chamber 550 and the upspout wall 588. The exterior wall 569 of the mixing chamber 550 also includes a frustoconical section 579 above the upper most portion of the first catalyst inlet 554. The increasing superficial velocity produced by the frustoconical sections promotes mixing.

Figure 10:
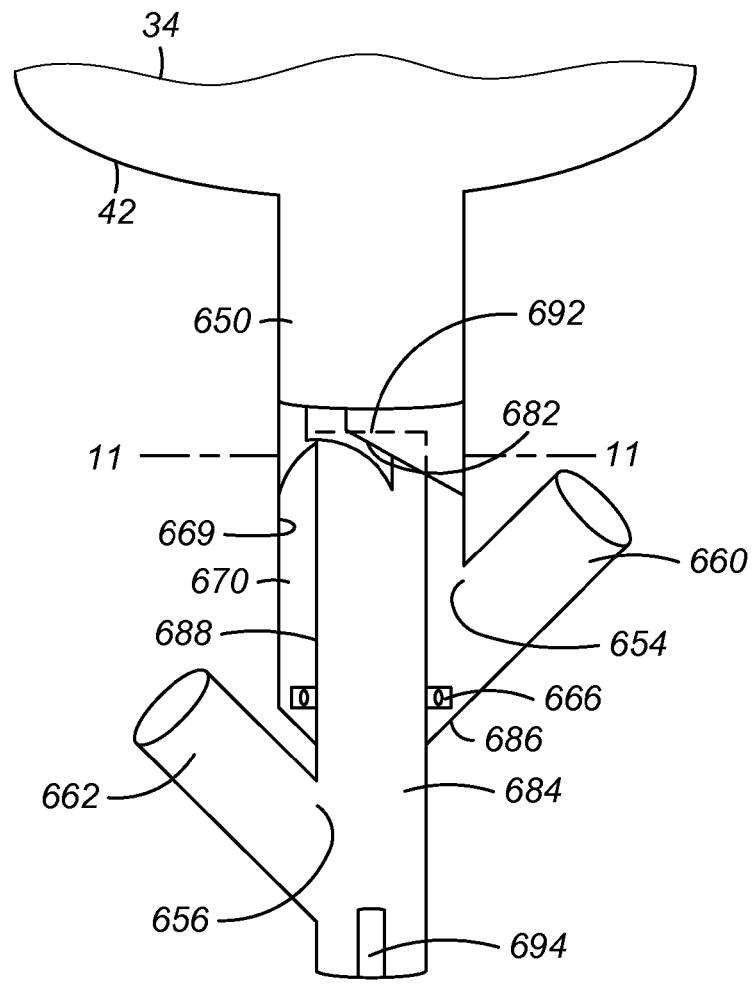
Figure 11:
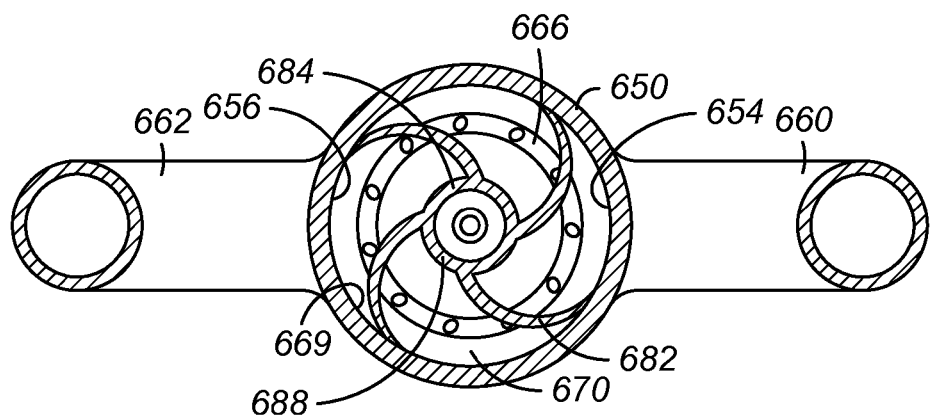

Reference is made to FIGS. 10 and 11, with continuing reference to FIG. 1, where FIG. 11 is taken along plane 11-11 from FIG. 10. The embodiment of FIG. 10 illustrates the mixing chamber 650 with a section of the exterior wall 669 removed to show the lower portions of mixing vanes 682, where the exterior wall 669 covers the upper portions of the mixing vanes 682, and the upper most portion of the upspout 684 is shown with dashed lines because it is hidden behind the mixing vanes 682. The second catalyst inlet 656 opens into the upspout 684, and catalyst from the second catalyst line 662 is fluidized and carried upward by the fluidizing gas inlet 694 positioned below a lower most portion of the second catalyst inlet 656. The first catalyst inlet 654 opens into the annular space 670 and is fluidized and carried upward by gases from the mixing gas distributor 666. The upspout top 692 is open in the illustrated embodiment, so catalyst freely flows upward out of the upspout 684. Mixing vanes 682 extend from the exterior wall 669 of the mixing chamber 650 to the upspout wall 688 to impart a swirling motion beginning in the annular space 670. The mixing vanes 682 may be helical to increase the swirling motion of the fluidized catalyst. In some embodiments, the mixing vanes 682 extend above the upspout top 692, but in other embodiments (not illustrated) the mixing vanes 682 terminate at or below the upspout top 692. The lower most portions of the mixing vanes 682 may be at an elevation above the upper most portion of the first catalyst inlet 654.

Figure 12:
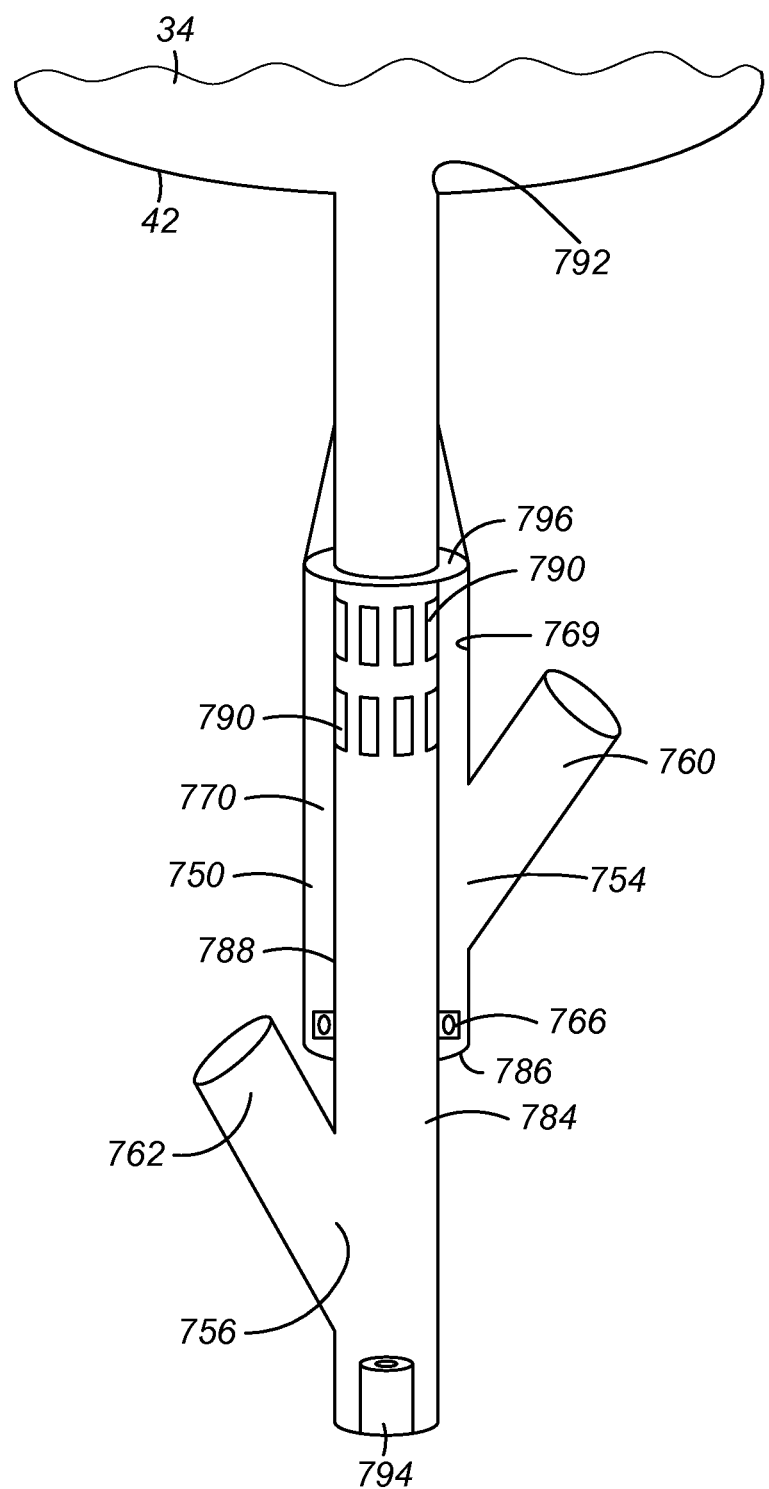

FIG. 12 illustrates yet another embodiment with a mixing chamber 750 and an upspout 784. The second catalyst inlet 756 opens into the upspout 784, and the first catalyst inlet 754 opens into the mixing chamber 750. The fluidizing gas inlet 794 and the mixing gas distributor 766 are positioned within the upspout 784 and the mixing chamber 750 below the lower most portion of the second catalyst inlet 756 first catalyst inlet 754, respectively, as described above. An upspout baffle 796 extends from the upspout wall 788 to the exterior wall 769 of the mixing chamber 750 and prevents catalyst from entering the stagnant section of the annular space 770 above the upspout gap 790. The upspout baffle extends across the entire annular space 770 to completely block the stagnant section of the annular space 770. The upspout gap 790 is at an elevation above the lower most portion of the first catalyst inlet 754 and also at an elevation above the upper most portion of the first catalyst inlet 754 in some embodiments. The upspout gap 790 is also at an elevation below the upspout baffle 796. Catalyst from the first catalyst line 760 enters the annular space 770 of the mixing chamber 750 and passes through the upspout gap 790 to mix with the catalyst from the second catalyst line 762 in the upspout 784. The mixed catalyst then flows through the upspout 784 into the combustion chamber 34. As such, the mixing chamber 750 is fluidly coupled to the combustion chamber 34 through the upspout gap 790 and the upspout 784.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the application in any way. Rather, the foregoing detailed description will provide those skilled in the art with a convenient road map for implementing one or more embodiments, it being understood that various changes may be made in the function and arrangement of elements described in an exemplary embodiment without departing from the scope, as set forth in the appended claims.

The invention claimed is:

1. A catalyst regenerator comprising:
   a combustion chamber having a combustion chamber diameter and a combustion chamber bottom;
   a mixing chamber fluidly coupled to the combustion chamber at the combustion chamber bottom, wherein the mixing chamber has an exterior wall and a mixing chamber diameter less than the combustion chamber diameter;
   a first catalyst inlet fluidly coupled to the mixing chamber;
   a second catalyst inlet fluidly coupled to the mixing chamber; and
   a mixing cylinder within the mixing chamber, wherein the mixing cylinder and the exterior wall define an annular space there-between, and wherein the mixing cylinder comprises a cylinder opening.

2. The catalyst regenerator of claim 1 wherein the cylinder opening extends from below a lower most portion of the first catalyst inlet to above an upper most portion of the first catalyst inlet.

3. The catalyst regenerator of claim 1 wherein the mixing cylinder comprises a cylinder top that is closed, and wherein the cylinder opening terminates below the cylinder top.

4. The catalyst regenerator of claim 1 wherein the mixing cylinder comprises a cylinder wall section, and wherein the cylinder wall section is positioned facing the first catalyst inlet and the second catalyst inlet.

5. The catalyst regenerator of claim 1 wherein the cylinder opening faces one of the first catalyst inlet or the second catalyst inlet.

6. The catalyst regenerator of claim 1 wherein the mixing chamber comprises a frustoconical section, wherein the mixing cylinder comprises a closed cylinder top, and wherein the closed cylinder top is within the frustoconical section.

7. The catalyst regenerator of claim 1 further comprising:
   a swirl arm coupled to the mixing cylinder, wherein the swirl arm defines an arcuate path from an interior of the mixing cylinder to the annular space.

8. The catalyst regenerator of claim 1 further comprising:
   a mixing gas distributor positioned within the mixing chamber exterior to the mixing cylinder.

9. The catalyst regenerator of claim 1 further comprising:
   a catalyst separator fluidly coupled to the combustion chamber;
   a riser coupled to the catalyst separator; and
   wherein one of the first or second catalyst inlets is fluidly coupled to the catalyst separator, and the other of the first or second catalyst inlet is fluidly coupled to the riser.

10. The catalyst regenerator of claim 1 further comprising:
    a third catalyst inlet fluidly coupled to the mixing chamber.

11. The catalyst regenerator of claim 1 further comprising:
    a helical mixing vane positioned within the mixing cylinder, wherein the cylinder opening is at a bottom of the mixing cylinder, wherein the cylinder opening is positioned above a mixing chamber bottom, and wherein the mixing chamber is fluidly coupled to the combustion chamber through the mixing cylinder; and
    a mixing gas distributor within the mixing chamber, wherein the mixing gas distributor is positioned within the mixing chamber below the mixing cylinder.

12. A catalyst regenerator comprising:
    a combustion chamber having a combustion chamber diameter and a combustion chamber bottom;

a mixing chamber fluidly coupled to the combustion chamber at the combustion chamber bottom, wherein the mixing chamber comprises an exterior wall;
a first catalyst inlet fluidly coupled to the mixing chamber;
an upspout fluidly coupled to the mixing chamber, wherein the upspout includes an upspout wall extending into the mixing chamber from a mixing chamber bottom, wherein the upspout wall and the exterior wall define an annular space there-between; and
a second catalyst inlet fluidly coupled to the upspout.

13. The catalyst regenerator of claim 12 further comprising:
a fluidizing gas inlet positioned within the upspout; and
a mixing gas distributor positioned within the mixing chamber.

14. The catalyst regenerator of claim 12 wherein the upspout wall has a frustoconical shape within the mixing chamber.

15. The catalyst regenerator of claim 12 wherein the mixing chamber comprises a frustoconical section.

16. The catalyst regenerator of claim 12 further comprising helical mixing vanes within the annular space, wherein the mixing vanes extend from the exterior wall to the upspout.

17. The catalyst regenerator of claim 12 wherein the upspout wall defines an upspout gap, the catalyst regenerator further comprising:
an upspout baffle extending between the exterior wall and the upspout wall at an elevation above the upspout gap, wherein the upspout baffle extends across the entire annular space such that the first catalyst inlet is fluidly coupled to the combustion chamber through the upspout and the upspout gap.

18. The catalyst regenerator of claim 12 further comprising:
a catalyst separator fluidly coupled to the combustion chamber;
a riser coupled to the catalyst separator; and
wherein one of the first or second catalyst inlets is fluidly coupled to the catalyst separator, and the other of the first or second catalyst inlets is fluidly coupled to the riser.

19. The catalyst regenerator of claim 12 further comprising:
a third catalyst inlet fluidly coupled to one of the mixing chamber or the upspout.

20. A method of regenerating catalyst, the method comprising the steps of:
adding a spent catalyst to a mixing chamber, wherein the mixing chamber is positioned below a combustion chamber, and wherein the mixing chamber is in fluid communication with the combustion chamber;
adding a recovered catalyst to the mixing chamber;
mixing the spent catalyst and the recovered catalyst in a mixing cylinder positioned within the mixing chamber; and
discharging the mixed spent catalyst and recovered catalyst from the mixing chamber into the combustion chamber.

* * * * *